2,950,953
PROCESS FOR PRODUCING ANHYDROUS HYDROGEN CHLORIDE

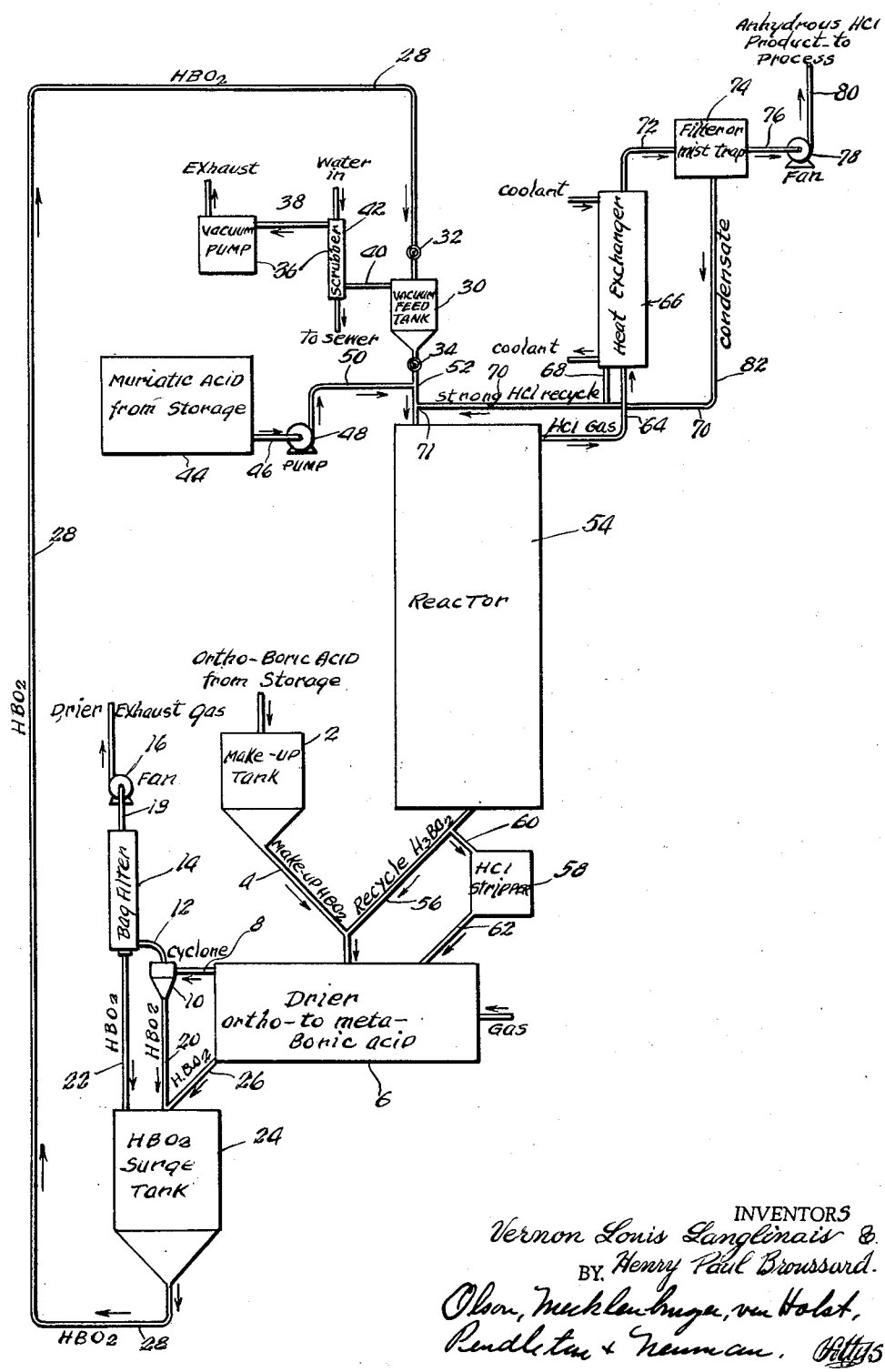

Vernon Louis Langlinais and Henry Paul Broussard, Weeks, La., assignors to Morton Chemical Company, Woodstock, Ill., a corporation of Delaware Filed May 5, 1958, Ser. No. 733,140

17 Claims. (Cl. 23—154)

This invention relates to the production of anhydrous hydrogen chloride and more particularly to a process for the production of anhydrous hydrogen chloride gas from aqueous hydrochloric acid.

While the terms "hydrogen chloride" and "hydrochloric acid" are often used interchangeably, it is believed that the term "hydrogen chloride" is preferably used with reference to the gaseous material HCl, and "hydrochloric acid" is preferably used with reference to an aqueous solution of hydrogen chloride gas. Accordingly the foregoing convention will be observed in the following specification and appended claims.

The production of hydrogen chloride in its anhydrous form is well known in the art and may be carried out by a variety of methods. The most pertinent of these prior art methods presently utilized in industry are:

(1) Burning chlorine with hydrogen or hydrocarbons
(2) Extractive distillation with sulfuric acid as an agent
(3) Extractive distillation with calcium chloride as an agent.

The prior art methods described above have various draw-backs which present difficulties in handling as well as being uneconomical in various respects. For example, the production of anhydrous hydrogen chloride by the burning or combustion of hydrogen and chlorine involves the use of expensive raw materials which are difficult to handle and quite dangerous. Particularly the use of hydrogen gas is known to involve danger of explosion. Furthermore, the combustion method technique requires special equipment and chambers for the carrying out of this process, and the crude product must necessarily be rectified to remove undesirable contaminants and by-products. The extractive distillation method employing sulfuric acid is of course difficult due to the character of the dehydrating agent utilized. Sulfuric acid is quite corrosive and requires special equipment for handling and regeneration. The use of calcium chloride presents problems similar to those of the sulfuric acid process.

It is also true that some of the foregoing methods require the use of rectification columns. Other methods require the concentration of a corrosive acid solution or a concentrated salt solution which presents special difficulties with regard to the nature of the equipment utilized. Methods based upon the principle of azeotropic distillation often require high acid recirculation rates which add to the expense and unnecessary complication of the process.

It would therefore be beneficial to provide a process for the production of an anhydrous hydrogen chloride gas by a method which would eliminate the above difficulties associated with the prior art techniques.

Accordingly one object of the present invention is the provision of a process for the production of anhydrous hydrogen chloride which is adaptable to relatively simple equipment.

Another object is the provision of a process for the production of anhydrous hydrogen chloride utilizing readily available raw materials.

A further object is the provision of a process which does not require the use of corrosive dehydrating agents.

A still further object is the provision of a process wherein the dehydrating agent may be regenerated by relatively simple methods and equipment.

A still further object is the provision of a process for producing hydrogen chloride which is both rapid and efficient.

A still further object is the provision of a process for producing gaseous hydrogen chloride from aqueous solutions of any range of concentration of hydrochloric acid.

A still further object is the provision of a process which does not require rectification of the product.

A still further object is the provision of a process for producing anhydrous hydrogen chloride which utilizes relatively mild reaction conditions.

These and other objects of the present invention will appear from the following description, the accompanying drawing, and the appended claims.

In one specific embodiment the process of the present invention relates to a method of producing anhydrous hydrogen chloride gas which comprises treating an aqueous solution of hydrochloric acid with metaboric acid and recovering the gaseous hydrogen chloride produced thereby in substantially anhydrous form. More specifically, the present process involves the reaction of aqueous hydrochloric acid with at least the stoichiometric amount of metaboric acid required to react with the water present in said aqueous solution to form orthoboric acid and recovering therefrom the gaseous hydrogen chloride evolved from the reaction mixture in substantially anhydrous form.

For a clearer understanding of the present invention reference should be had to the drawing which comprises a flow sheet or schematic diagram illustrating in one form the process of the present invention.

Orthoboric acid ($H_3BO_3$) from storage is fed into a make-up tank 2 and through conduit 4 to a drier 6 until the system is under full load (that is, the requisite amount of orthoboric acid is available for continuous processing). The drier 6 is operated to dehydrate the orthoboric acid to metaboric acid. Temperatures of from about 105° C. to about 150° C. are useful. The drier 6 may be conveniently chosen from several types available such as for example flash or rotary driers or a roasting furnace of the Herreshoff type. When utilizing driers of the rotary or flash drier types, the effluent therefrom (hot gases and metaboric acid) is preferably passed through conduit 8 to a cyclone separator 10. The gaseous or air output of the cyclone separator 10 is further conducted through line 12 through a bag filter 14 for the recovery of fines, and thence through line 18 and fan 16, from which latter the gas is exhausted to the atmosphere. The solid metaboric acid ($HBO_2$) from cyclone 10 and bag filter 14 is conducted through lines 20 and 22 respectively and collected in a surge tank 24. Alternatively, when utilizing a drier or roasting furnace of the Herreshoff type, the bulk of the dry, solid metaboric acid may be passed directly into surge tank 24 through line 26. Gaseous effluent from the drier may be conducted to a bag filter 14 to remove any residual metaboric acid carried over therewith and the solids passed through line 22 to tank 24. The cyclone 10 is not necessary in this sort of system since the solids ($HBO_2$) content of the effluent gases is low, as contrasted to other methods.

The metaboric acid from the driers is at a temperature of from 120° to 150° C. The surge tank 24 should be of sufficient capacity to contain the normal "hold-up" load of the system during shutdown.

The metaboric acid in surge tank 24 passes through line 28 to a small feed tank 30 located above the reactor. The feed tank is equipped with an inlet seal 32 and outlet seal 34. The tank 30 is connected to a vacuum pump 36 through lines 38 and 40, these lines having an intermediate water scrubber 42.

The function of the vacuum pump 36 is to remove air entrained in the metaboric acid, which, if present, would result in a dilution of the hydrogen chloride products. In operation, the seals 32 and 34 are closed and air is exhausted from the feed tank 30. Since HCl gas will flow into the evacuated tank 30 from the reactor on opening seal 34 (as later described) and thence through the exhaust system, the scrubber 42 is provided to remove residual HCl gas and prevent damage to the pump 36. Muriatic acid is maintained in a suitably lined storage tank 44 and passes through line 46, pump 48 and line 50. The streams of metaboric acid from tank 30 and muriatic acid (aqueous hydrochloric acid) are combined at juncture 52. The muriatic acid is preferably introduced by spraying under pressure maintained by pump 48. The weight ratio of the metaboric acid is maintained at from about 2.0 to 2.5 parts thereof to 1 part of muriatic acid (containing about 32 weight percent HCl) with the higher value of this ratio being most preferred. The reactants comprising combined metaboric and muriatic acids are passed into a reactor 54 which in one preferred embodiment has the form of a vertical cylindrical vessel, preferably lined with glass. The reactor is equipped with a slow-speed agitator (not shown). Generally, the agitator is preferably designed to promote movement of the reaction mixture downward (vertically) without channeling. The reaction mixture is maintained in the reactor for a period of about two hours, during which time its physical nature changes from a wet to a moist, and finally to a dry fluffy powder, primarily a mixture of orthoboric acid, unreacted metaboric acid, and occasionally trace amounts of HCl gas, which is passed out of the bottom of the reactor through line 56 to the drier 6 for dehydration and recycle. Alternatively, the effluent solids may be passed to the drier 6 through a stripper 58 via lines 60 and 62 to remove traces of HCl and thence to the drier 6. A suitable air lock (not shown) should be maintained in the lines between the reactor 54 and drier 6 to preclude entrance of moisture or air.

The effluent gases or product (comprising principally hydrogen chloride gas and a minor amount of water vapor) from reactor 54 pass through line 64 to a graphite lined heat exchanger 66 which latter is utilized to bring these gases down to the desired temperature. The coolant for heat exchanger 66 may be any suitable medium such as water or refrigerated brine, or both in series.

The condensate from heat exchanger 66 in the form of a strong aqueous HCl solution passes into line 68 and thence is recycled to the reactor feed through line 70 at juncture 71. The effluent hydrogen chloride gas from the heat exchanger 66 is conducted through conduit 72 to a mist trap or filter 74 and through line 76, fan 78 and line 80 to storage. The final product flowing from line 80 is substantially anhydrous hydrogen chloride gas which may be compressed and stored in cylinders or passed through further conduits for use in another process. The fan 78 is preferably rubber lined and provided with shaft seals. The mist trap 74 should also be constructed of material resistant to hydrogen chloride gas and aqueous hydrochloric acid. Condensate in the form of strong aqueous hydrochloric acid from the mist trap 74 is passed through line 82 to line 70 for recycle to the reactor feed in the same manner as the condensate from heat exchanger 66.

As may be understood from the above description, the foregoing process involves the treatment of an aqueous hydrochloric or commercial muriatic acid with metaboric acid. The reaction products resulting from this first step may, for convenience, be considered as a solid product or fraction which comprises primarily orthoboric acid and unreacted metaboric acid; and a gaseous fraction of which the main component is hydrogen chloride gas accompanied by minor amounts of moisture. The solid component is recovered, dehydrated to convert orthoboric acid to metaboric acid and the dehydrated product recycled in the process. The gaseous fraction or product is further treated to condense water vapor entrained therein and recover such condensate in the form of hydrochloric acid which is also recycled in the process and dehydrated to form hydrogen chloride.

Broadly, the process of the present invention may be carried out over a wide range of temperature conditions. Thus the metaboric acid may be reacted with the aqueous hydrochloric acid at temperatures ranging from ambient temperature to the boiling point of the hydrochloric acid. Generally temperatures from between about 40° C. and 90° C. are preferred, and temperatures of from 70° C. to 85° C. are the most preferred. Of course, it is necessary to maintain the temperature below that which results in the dehydration of the orthoboric acid to eliminate the consequent introduction of water into the gaseous product. The mixing of metaboric acid, preferably in stoichiometric excess, with aqueous solutions of hydrochloric acid results in immediate evolution of hydrogen chloride gas which continues until no water remains in the hydrochloric acid solution reactant, and the hydrogen chloride is evolved in gaseous form. Pressure is not a critical factor in the present invention, and accordingly the process may be carried out at atmospheric pressure or at pressures which are above or below atmospheric pressure. Preferably, the feed tank is maintained under vacuum or subatmospheric pressure primarily for the removal of entrained air which, if present, would result in dilution of the gaseous hydrogen chloride product to the extent of about 0.3 to about 0.7 weight percent.

The ratio of reactants may vary although it should be stated that the preferred procedure involves the treatment of the aqueous hydrochloric acid with at least the stoichiometric amount of metaboric acid which is required to react with the aqueous component of the hydrochloric acid reactant. Thus for any given aqueous solution of hydrochloric acid the amount of metaboric acid required (stoichiometric amount) may be computed by determining the amount of water present in the hydrochloric acid starting material. It is a most preferred procedure that a stoichiometric excess of metaboric acid be utilized to increase the rate of reaction and insure the complete removal of any water present. Thus from a 15% to 40% stoichiometric excess is adequate, although greater amounts may of course be utilized, but such greater amounts do not contribute to the efficiency of the process and are merely uneconomical.

The time required for this reaction may vary according to the temperature, the amount of dehydrating agent utilized, and the concentration of the aqueous hydrochloric acid, but generally from about 60 to about 120 minutes are satisfactory. As may readily be understood, dry or anhydrous hydrogen chloride gas has a great affinity for water, and to preclude the contamination of the anhydrous hydrogen chloride product, precautions should be taken to exclude the effluent hydrogen chloride gas from contact with the atmosphere which ordinarily contains small amounts of moisture.

The metaboric acid reactant is converted by hydration to orthoboric acid in the treatment of the aqueous hydrochloric acid. The orthoboric acid produced by this reaction may be readily dehydrated, by heating at elevated temperatures, to the metaboric form, and recycled in the process. Temperatures preferably above about 90° C. are utilized, although somewhat higher temperatures of from 110° C. to 150° C. are most preferred. While orthoboric acid dehydration will occur and will even progress more rapidly at temperatures in excess of 150° C., such high temperatures become less desirable because of boric acid losses thereby incurred. Solid orthoboric acid possesses a measurable vapor pressure at 100° C., which vapor pressure increases rapidly with increasing temperature. It should be understood that in the preferred embodiment, wherein a stoichiometric excess of metaboric acid is used, the solid fraction of the product recovered from the reactor comprises a mixture of orthoboric acid and unreacted metaboric acid. However, the fact that the orthoboric and metaboric acids are present in such mixture has no effect on the dehydration step as taught herein.

It is also possible to carry the dehydration of orthoboric acid not only to metaboric but also to pyroboric acid, any of the hydrated forms of boric anhydride having less water than orthoboric acid, or even to boric anhydride itself by the use of suitably controlled temperatures and times, although this is not necessary or a preferred practice. The conversion of orthoboric acid to metaboric acid will also occur at temperatures lower than 90° C. by the use of subatmospheric pressure.

The dehydration of orthoboric acid to metaboric acid proceeds in accordance with the following equation:

(1) 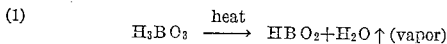
$$H_3BO_3 \xrightarrow{heat} HBO_2 + H_2O \uparrow (vapor)$$

It is preferred that the by-product orthoboric acid be dehydrated to metaboric acid by heating, and recycled to the reactor.

The hydrogen chloride gas produced by the dehydration of aqueous hydrochloric acid solutions will ordinarily contain a small amount of moisture entrained in the vapors or gaseous fraction of the effluent from the reactor. The moisture, present in minor amount, is preferably removed by condensation or cooling of the gaseous product recovered from the reactor. It is also a preferred procedure to use filters or mist traps to remove and recover the moisture in the form of a strong aqueous hydrochloric acid condensate. The resulting condensates of aqueous hydrochloric acid solution are preferably recycled to the reactor for dehydration and further production of hydrogen chloride by contact with metaboric acid, or if desired accumulated in a storage vessel. Condensers utilized to cool the hydrogen chloride gas to temperatures of from about −10° C. to about 40° C. are satisfactory.

Exemplary of cooling conditions achieved by the use of condensers and the like, which will result in elimination of substantially all moisture, are the following:

| Gas Temperature (Hydrogen chloride) | Water in product (percent by weight) |
|---|---|
| 30° C. | 0.21 |
| 0° C. | 0.02 |

The following example will illustrate one specific method of carrying out the process of the present invention.

*Example*

Into a glass-lined reactor equipped with inlet and outlet conduits and sealed to exclude atmospheric moisture, were introduced 100 parts by weight of commercial muriatic acid (31.5 percent HCl). Concomitantly with the introduction of the muriatic acid were aded 209 parts by weight (a 25% stoichiometric excess) of metaboric acid. The reactants were introduced at normal room temperature. The reaction mixture was stirred and the temperature rose during reaction to 65° C. due to the exothermic nature of the process. The hydrogen chloride gas as evolved therefrom was withdrawn from the reaction vessel via the outlet conduit and passed through a graphite lined condenser maintained at about 30° C. by cooling and thereafter through a mist trap to remove traces of residual moisture. The condensate from the condenser and the mist trap in the form of strong hydrochloric acid was recovered for recycle and subsequent dehydration with metaboric acid. If desired, the strong condensate acid can be directly recycled to the reactor. The anhydrous hydrogen chloride gas at 30° C. contains 0.21 percent by weight of water. The residue in the reactor, consisting essentially of orthoboric acid and unreacted metaboric acid, was removed therefrom and passed through a heated chamber maintained at about 105° C. to 130° C. to drive water from the orthoboric acid. The resulting metaboric acid is recycled to the reactor for further treatment and dehydration of muriatic acid. The above experiment was carried out in a sealed system to substantially preclude contact with the atmosphere and concomitant absorption of moisture.

While the foregoing process has been illustrative of a specific method of preparing anhydrous hydrogen chloride gas, it is true that other equivalent systems may also be utilized to advantage. Thus, if preferred, the process may be carried out by a batch method rather than continuous recycle of the orthoboric and metaboric acid, although for an operation of any size the continuous operation with recycle is the most economical and preferred.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A process for the production of anhydrous hydrogen chloride which comprises reacting an aqueous solution of hydrochloric acid with at least the stoichiometric amount of a boron oxide dehydration agent selected from the group consisting of boric anhydride, metaboric acid and pyroboric acid, required to react with the water present in said aqueous solution to form a hydration product of said boron oxide dehydration agent, recovering the gaseous hydrogen chloride evolved from said reaction mixture, recovering the hydrated boron oxide formed in said reaction, and dehydrating the same by heating to form a boron oxide dehydration agent selected from the aforesaid group, and recycling said dehydration agent in the process.

2. The process of claim 1 wherein the reaction mixture and the hydrogen chloride are excluded from contact with atmospheric moisture.

3. The process of claim 1 wherein the reaction is carried out at a temperature between about 40 and 90° C.

4. The process of claim 1 wherein the reaction is carried out at a temperature between about 70 and 85° C.

5. A process for the production of anhydrous hydrogen chloride which comprises reacting an aqueous solution of hydrochloric acid with at least the stoichiometric amount of metaboric acid required to react with the water component of said aqueous acid solution to thereby form orthoboric acid, recovering the gaseous hydrogen chloride evolved from said reaction mixture, recovering orthoboric acid formed in said reaction, and dehydrating the orthoboric acid by heating to metaboric acid and recycling the metaboric acid in the process.

6. The process of claim 5 wherein the reaction mixture and the hydrogen chloride gas are excluded from contact with atmospheric moisture.

7. The process of claim 6 wherein the reaction is carried out at a temperature between about 40° and 90° C.

8. A process for the production of anhydrous hydrogen chloride which comprises treating an aqueous hydrochloric acid solution with metaboric acid in an amount in excess of the stoichiometric amount required to react with the water in the aqueous component of the acid solution to produce substantial anhydrous hydrogen chloride gas and orthoboric acid, recovering the hydrogen chloride gas evolved from the reactants, recovering and dehydrating the orthoboric acid by heating to form metaboric acid, and recycling the metaboric acid in the process.

9. The process of claim 8 wherein the stoichiometric excess of metaboric acid is from 15% to 40%.

10. The process of claim 8 wherein the hydrochloric acid dehydration is carried out at a temperature of from 70° to 85° C.

11. The process of claim 8 wherein the hydrogen chloride gas is further treated by cooling and condensation to remove traces of moisture contained therein in the form of an aqueous hydrochloric acid condensate.

12. The process of claim 11 wherein the aqueous hydrochloric acid is recycled in the process.

13. The process of claim 8 wherein the dehydration of orthoboric acid to metaboric acid is carried out by heating at a temperature between about 105° and 150° C.

14. A continuous process for the production of anhydrous hydrogen chloride gas which comprises treating and dehydrating an aqueous hydrochloric acid solution with at least the stoichiometric amount of metaboric acid required to react with the water present in the aqueous hydrochloric acid, to produce hydrogen chloride and orthoboric acid, recovering the gaseous hydrogen chloride, and removing traces of aqueous hydrochloric acid contained therein by cooling and condensation, recycling the aqueous hydrochloric acid condensate to the reaction mixture and dehydration step, recovering and dehydrating the orthoboric acid formed in said reaction by heating to produce metaboric acid, and recycling the metaboric acid in the process, said process of dehydration being carried out under conditions to exclude contact with atmospheric moisture.

15. The process of claim 14 wherein the dehydration of hydrochloric acid is carried out at a temperature between about 40° and 90° C.

16. A continuous process for the production of anhydrous hydrogen chloride gas which comprises treating an aqueous hydrochloric acid solution with metaboric acid in an amount in excess of the stoichiometric amount required to react with water in the aqueous component of the acid solution, to produce hydrogen chloride gas and orthoboric acid, recovering as a gaseous fraction the hydrogen chloride produced thereby, and a minor amount of water vapor, cooling and condensing said gaseous fraction to remove said water vapor contained therein in the form of aqueous hydrochloric acid, recycling said aqueous hydrochloric acid condensate to the reaction mixture, recovering as a solid component orthoboric acid and unreacted metaboric acid from said reaction mixture, heating and dehydrating said solid component to convert orthoboric acid contained therein to metaboric acid, and recycling the metaboric acid recovered from the dehydration step in the process to said hydrochloric acid treatment step.

17. The process of claim 16 wherein the treatment of hydrochloric acid and recovery of hydrogen chloride are carried out under conditions to substantially exclude contact with atmospheric moisture.

References Cited in the file of this patent

UNITED STATES PATENTS

| | | |
|---|---|---|
| 2,064,113 | Heuser | Dec. 15, 1936 |
| 2,367,301 | Mohr | Jan. 16, 1945 |

UNITED STATES PATENT OFFICE

CERTIFICATE OF CORRECTION

Patent No. 2,950,953                                        August 30, 1960

Vernon Louis Langlinais et al.

It is hereby certified that error appears in the printed specification of the above numbered patent requiring correction and that the said Letters Patent should read as corrected below.

Column 5, line 35, for "The moisture" read -- This moisture --; column 6, line 3, after "strong" insert -- aqueous --; line 63, before "metaboric" insert -- form --.

Signed and sealed this 4th day of April 1961.

(SEAL)
Attest:
ERNEST W. SWIDER
~~KARL H. AXLINE~~
Attesting Officer

ARTHUR W. CROCKER
Acting Commissioner of Patents